Figure 1:
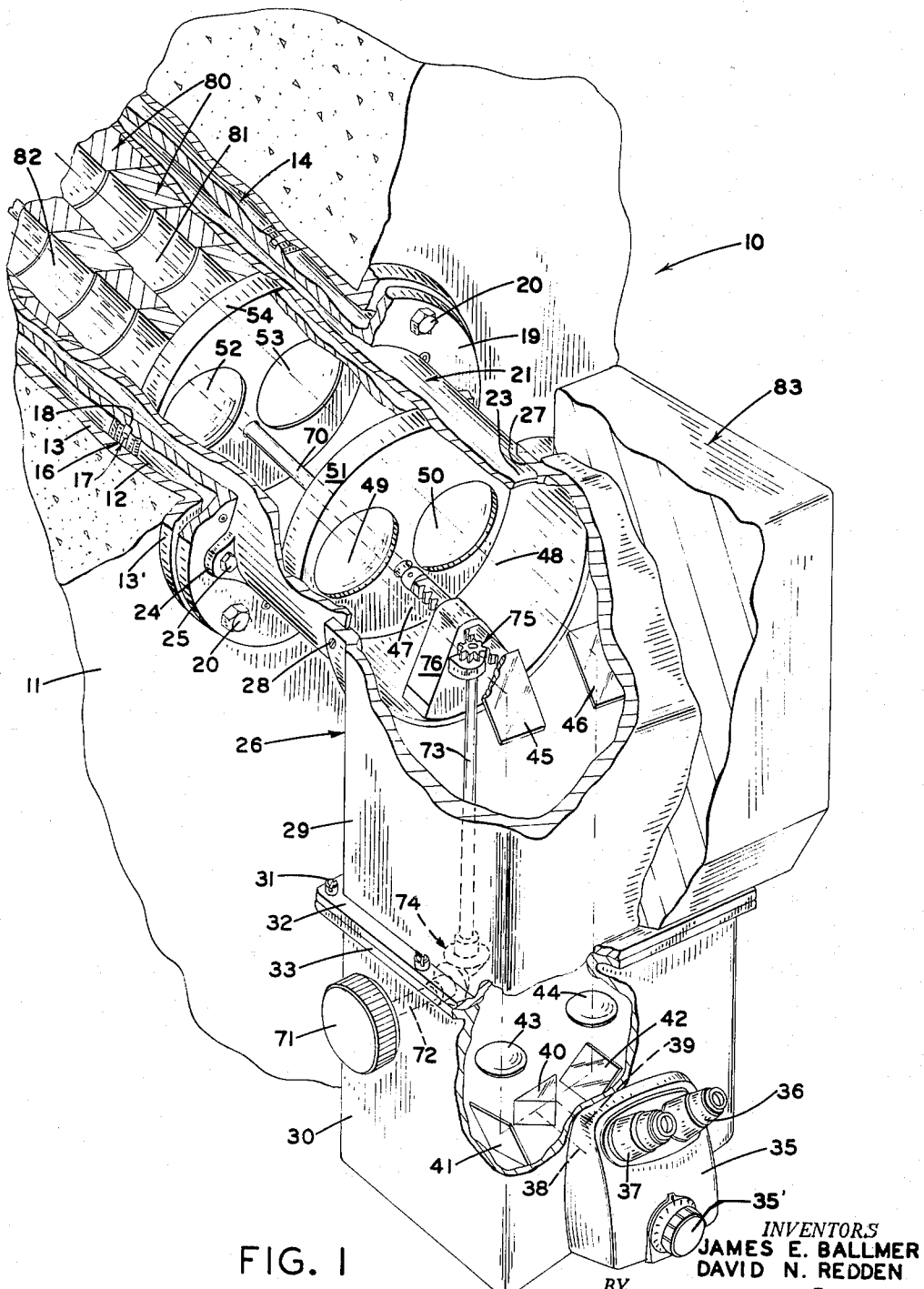

Aug. 24, 1965       J. E. BALLMER ETAL       3,202,048
    OPTICAL INSTRUMENT WITH MICROSCOPE UNIT AND NESTED
           TUBES FOR VIEWING OBJECTS IN CLOSED CHAMBER
Filed Aug. 25, 1961                              2 Sheets-Sheet 1

INVENTORS
JAMES E. BALLMER
DAVID N. REDDEN
BY
Frank C. Parker
ATTORNEY

Aug. 24, 1965    J. E. BALLMER ETAL    3,202,048
OPTICAL INSTRUMENT WITH MICROSCOPE UNIT AND NESTED
TUBES FOR VIEWING OBJECTS IN CLOSED CHAMBER
Filed Aug. 25, 1961    2 Sheets-Sheet 2
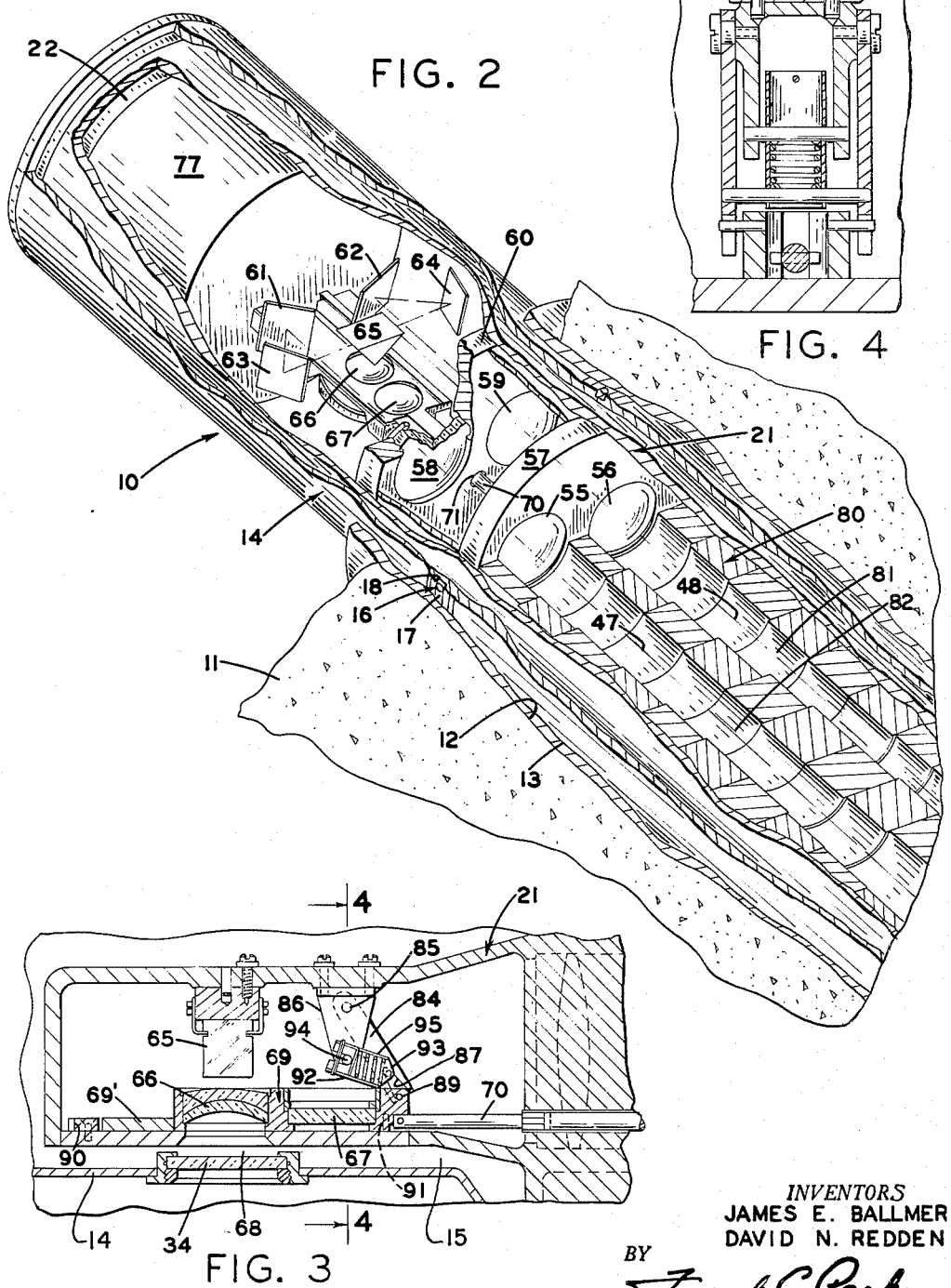
INVENTORS
JAMES E. BALLMER
DAVID N. REDDEN
BY
Frank C. Parker
ATTORNEY

3,202,048
OPTICAL INSTRUMENT WITH MICROSCOPE UNIT AND NESTED TUBES FOR VIEWING OBJECTS IN CLOSED CHAMBER

James E. Ballmer, Chili, and David M. Redden, Rochester, N.Y., assignors to Bausch & Lomb Incorporated, Rochester, N.Y., a corporation of New York
Filed Aug. 25, 1961, Ser. No. 133,970
1 Claim. (Cl. 88—39)

This invention relates to a microscope which is particularly adapted to viewing objects remote from the observer and more particularly relates to mechanisms of an improved nature for accomplishing this feature.

It is an object of this invention to provide a microscope for remotely viewing an object, said microscope being especially although not exclusively adapted for use within a closed chamber, the viewing parts of said microscope in this case being located exteriorly to said chamber whereby a view of a remote microscopical article is to be viewed.

Another object is to provide such a microscope which is sealed in an opening through a wall of such a chamber, but which is readily demountable therefrom as a complete operating unit for service and adjustment purposes.

A further object is to provide such a device which is constructed in such a manner and of such materials that a maximum protection against undesirable radiation is afforded to the user of the microscope when viewing dangerous radiation products within a chamber.

A still further object is to provide such a device wherein certain mechanisms thereof are constructed inside the aforesaid chamber, said mechanisms including a plurality of alternatively or selectively used optical parts which are remotely moved from outside of said chamber by suitable external controls so as to secure various optical effects.

Further objects and advantages of this invention will be found in the combination, construction and arrangement of its parts as well as in the details of construction, reference being had to the following specification and accompanying drawings for a complete description thereof.

In the drawings:

FIGS. 1 and 2 are coextensive perspective views of the assembled microscope, parts thereof being broken away and shown in section for clarity of illustration, FIG. 3 is a cross-sectional view taken substantially on the axis of said microscope showing certain of the inner chamber optical parts and mechanical details associated therewith, and FIG. 4 is a partial cross-sectional view taken on the line 4—4 of FIG. 3.

The present invention comprises a microscope which is generally shown by the numeral 10 in FIGS. 1 and 2, said microscope comprising a generally exterior portion as represented in FIG. 1 and a generally interior portion as shown in FIG. 2.

According to a preferred form of this invention a chamber, not shown, having a wall 11 is formed with an opening 12 therethrough wherein an outer carrier or chassis tube 13 is tightly mounted and securely held. Said tube 13 has formed on its outer terminus a retaining flange 13' having suitable anchorages, not shown, extending therethrough and engaging the wall 11 whereby the tube 13 becomes in effect a part of said chamber wall 11. On the inner cylindrical surface of the outer tube 13 is demountably held a mounting sleeve 14 which extends therethrough from the front part of the tube 13 to the inside portion thereof and is extended still further into the chamber so as to provide therein a closed cylindrical chamber 15, best shown in FIG. 3, wherein an optical instrument may be held in such a manner as to be protected from contents of the chamber. To prevent radiations originating in the chamber from passing along the tube 13 to the outside of the chamber, sealing means 16 of any suitable construction such as that shown in FIGS. 1 and 2 are provided, including preferably an elastic sealing ring 17 which is held in a fitted groove 18. For holding the sleeve 14 in the outer tube 13, a flange 19 is provided on the outer end of said tube through which screws 20 may be threaded into the flange 13' of the outer tube 13.

Within the mounting sleeve 14 an instrument tube 21 is closely and slidably fitted so that it can be removed easily but at the same time form a fairly good vapor-tight joint. Said instrument tube 21 at its inner end is closed by a wall 22 which lies closely adjacent to the closed end of the tube 14 and substantially fills the chamber 15. At the outer end of the tube 21, it is extended considerably forwardly of the chamber wall 11 and is provided adjacent to its end with a bearing area 23 for purposes to be explained hereinafter. Also on the tube 21 are formed lugs 24 which abut against the flange 19 of the mounting sleeve, said lugs 24 having openings therethrough in which holding screws 25 are placed and which extend into threaded holes in the flange 19.

On the outer or outboard end of the bearing area 23 of the tube 21 an instrument housing generally designated by numeral 26 in the drawing is held, said instrument housing being provided with an inside mounting bearing 27 which fits the bearing area 23 of tube 21 and is suitably locked thereon by means of the lock screws 28 which are threaded through the housing. Said housing 26 is pendulously supported preferably solely by the connection 23–27 and extends downwardly a considerable distance along wall 11 which is intended to place the observer in a viewing position which is most favorable for sustained observation within the chamber.

Said chamber 26 is comprised of two principal parts which are an upper housing 29 and a lower housing 30 which are joined together in any preferred manner such as a plurality of screws 31 which extend through holes in a flange 32 formed on the upper portion 29 and are threaded into a flange 33 formed on the lower portion 30.

All of the operative optical parts of the microscope are assembled jointly in the space provided by the instrument tube 14 and the instrument housing 26 and said tube and housing together provide a sub-assembly which is demountable from the chamber wall 11 so as to bring the optical parts into operative position simultaneously ready for use. One of the greatest advantages of this particular assembly or sub-assembly is the fact that all of the microscope optical parts necessary for proper functioning as a microscope are by this means mounted in relation to each other in a completed state and therefore may be preadjusted and tested ready for use as an operative unit before inserting the unit into its operative position within the mounting sleeve 14.

In this connection it is worthy of attention that only one optical part remains outside of the instrument tube 21 and this part is best shown in FIG. 3 and constitutes a window 34 which is carefully fixed and sealed by a suitable mechanism into the mounting sleeve 14 in optical alignment between said optical system and the object under observation. Window 34 may be formed of non-browning glass, if desired.

On the lower portion 30 of the instrument housing 26 is mounted in optical alignment with the optical system an operational microscope unit 35 wherein suitable oculars 36 and 37 are held in axial alignment with a pair of respective objective lenses, not shown, which are aligned on the companion lines of sight 38 and 39. If desired, the objectives may be of the variable magnification type as shown and, if so, these variable power objectives may be operated by means of a knob 35' provided in a convenient place at the lower part of the microscope assembly 35.

As shown in the drawings and as preferred, part of the optical system may be of conventional design such as the microscope assembly 35, and the optical parts which are extraneous from the microscope assembly 35 are located within the housing 26 and instrument tube 21, said extraneous parts being comprised in a relay system of lens and mirror and/or prism mechanisms.

Said relay means comprise a biprism 40 (FIG. 1) located medially rearwardly of the microscope assembly 35 in an axial alignment therewith thereby the lines of sight 38 and 39 are deflected laterally to a pair of oblique mirrors 41 and 42 which in turn deflect the lines of sight upwardly through the housing 30 and through a pair of relay lenses 43 and 44. At the upper terminus of the vertical portions of the lines of sight, a pair of upper mirrors 45 and 46 are provided which deflect the two lines of sight along horizonal portions 47 and 48, respectively, thereof. Said sight lines are refracted in turn by a first pair of lenses 49 and 50 which are fixedly mounted in a cross wall 51 within tube 21. Therefrom the horizontal lines of sight 47 and 48 are further refracted by a second pair of relay lenses 52 and 53 which are mounted together in a fixed cross wall 54 within tube 21 in the same manner as lenses 49 and 50.

Referring now to FIG. 2 of the drawing, a third pair of relay lenses 55 and 56 are provided for directing the lines of sight 47 and 48, said lenses being mounted in a fixed cross wall 57 within tube 21. A still further pair of relay lenses 58 and 59 are provided similar to the lenses 55 and 56, said last pair of lenses being mounted in the fixed cross wall 60 within tube 21.

Rearwardly along the lines of sight 47 and 48, said lines are deflected by a plurality of mirrors 61, 62, 63 and 64 so as to produce latteral portions of the line of sight which impinge upon a medially located vertically arranged upsidedown biprism 65 which deflects the lines of sight downwardly toward the object under observation, not shown.

For the purposes of viewing said object under different optical conditions, it is often desirable during the examination to change the power of the system beyond the changes of power afforded by the microscope assembly 35 or to provide a wide angle lens. Alternatively, it may be desirable to introduce suitable filters or polarization mechanisms fairly close to the object under observation but nevertheless within the protection of the instrument tube 21. Such a mechanism is provided in one of its desirable forms by means of a wide angle amplifier lens 66 which is alternatively and selectively used with a window 67 of suitable non-browning optical quality. These two optical members may be interchanged in position on the vertical optical sighting axis 68 which intersects the window 34, the mechanism whereby this is accomplished being provided preferably in the form of a slide 69 which is slidably mounted between suitable slideways 69' for motion preferably in the direction of horizontal lines of sight 47 and 48. Said slideways are fixed in any preferred manner to tube 21 and are suitably snugly fitted to slide 69 and are held by mechanism, not shown, in the inner end of the instrument tube 21 so as to be freely slidable along said axis.

Means are provided for moving said slide 69 axially comprising a suitable push rod 70 which is anchored in any preferred manner in the slide 69 and is carried through a clearance opening 71 formed in the wall 60 and the succeeding cross walls 57, 54 and 51 so as to carry the rod through to the exterior part of the tube where it enters the instrument housing 26. For actuating said slide 69, suitable mechanism is provided such as the operating knob 71, FIG. 1, which is connected by intervening shafts 72, 73 and mitre gearing 74 to a rack and pinion type of gearing assembly 75 arranged at the outer terminal end of the shaft 70. A support 76 of any preferred construction may be erected fixedly in the exterior end of the instrument tube 21 to serve as a bearing for the shaft 70.

One advantageous feature of this invention resides in means for protecting the operator or observer from undesirable or dangerous radiation activity which may penetrate through the opening 12 in the wall 11. Said means comprises a radiation barrier 77 of substantially cylindrical shape which is formed suitably to substantially fill and occupy the innermost portion of the instrument tube 21 as shown in FIG. 2 or said part may, if desired, be constructed within the sleeve 14. In addition to the radiation barrier 77, the side walls of the sleeve 14 are lined with radiation retarding or absorbing material of suitable properties for the entire distance occupied by the sleeve in the chamber and preferably extending within the opening 12, as shown in both FIGS. 1 and 2. The space between the lens holding wall 57 and the lens holding wall 54 is occupied by insulation material of any suitable form such as, for instance, discs 80 which are apertured at 81 and 82 to permit image rays to traverse through the instrument tube 21 along the lines of sight 47 and 48. These radiation resistant discs 80 progressively impede the undesirable radiation which may penetrate along the tube from inside of the close chamber sufficiently to cancel the effect of the same and render the microscope safe to use.

A further radiation barrier 83 is provided on the upper section of the instrument housing 26 comprising a massive formation of suitable barrier material 83 which covers a considerable part of the exposed area of the housing 26 to afford the maximum of protection from direct radiation which comes through the opening 12.

The conditions of use of the remote viewing microscope and associated chamber usually result in special design configurations in the exterior part as shown in FIG. 1, since the microscope parts must usually be located above the objects under observation high in the working chamber which is considerably above the desired eyepoint of the operator while seated before the microscope. Accordingly, the instrument housing 26 is extended a considerable distance below the instrument tube 21 and the microscope unit 35 is located low on said housing 26 to bring the eyepieces 36 and 37 down to a comfortable level for the operator.

A further feature of this invention concerns the means by which the slide 69 is held in its terminal positions in good optical alignment with the optical system of the instrument. It is necessary when using the wide angle lens 66, for instance to, establish said terminal positions with certainty and accuracy so that the performance of the wide angle lens will be optically acceptable.

Such means are preferably provided by a shift lever 84 which is hinged at 85 in a fixed bracket 86 at one end and is provided at its free end with an open slot 87. The end of lever 84 which contains slot 87 projects along the side of the slide 69 to allow free action of said lever. Loosely engaged with the slot 87 is a crosspin 89 which is anchored in the slide 69 so that translatory movements of said slide cause the end of the lever 84 to be carried along with it. Said movements are limited by the front and rear abutments 90 and 91, respectively. For maintaining the slide 69 solidly against the terminal abutments 90 or 91, an over-the-center switch mechanism is utilized comprising a tubular body 92 which is pivotally attached at one end at 93 to the shift lever 84 and is pivotally supported at its other end by a pivot pin 94 which is suitably fixed in the bracket 86. Within the body 92 a spring 95 is provided which applies a resilient force to the shift lever 84 in a well known manner to retain said slide against its respective abutment.

This invention provides, inter alia, a remote viewing microscope having advantageous and effective construction for improving viewing conditions of an object and embodying means for insulating the user of the microscope from undesirable radiations from within a chamber which contains the specimen, all of which is in conformity with the stated objects of this invention.

Although only a preferred form of this invention has been shown and described in detail, other forms are possible and changes may be made in the arrangement and construction of the details thereof without departing from the spirit of this invention.

We claim:

In an optical instrument having an optical system for exterior viewing of objects in a closed chamber, the combination of a microscope unit, an elongated upright housing extending along the wall of the chamber, said microscope unit being operatively secured on the lower part thereof so that said wall is interposed between said unit and said objects, an instrument tube extending horizontally through an opening in said wall, said tube having an open end located exteriorly of said chamber and having a closed end located interiorly thereof, means for securing the upper end of said housing to said open end of said tube in depending position, a window formed in the side wall of said tube near said closed end facing said objects to be viewed, an optical relay system for relaying image forming rays from said objects to the object plane of said microscope unit, said system comprising a plurality of optically aligned lenses which are operatively secured in said tube between said window and microscope unit, a plurality of optically aligned mirrors forming a penta-mirror which is located in fixed position in the closed end of the tube between said window and said relay system, said penta-mirror deviating the optical axis in a direction longitudinally of said tube, a second plurality of optically aligned mirrors fixed in said housing between the longitudinal portion of optical axis and said microscope unit for deviating the longitudinal portion of axis downwardly and in optical alignment with said unit, a mounting sleeve wherein said tube is slidably fitted, said tube being longer than said sleeve at the open end thereof so as to protrude from said sleeve, the inner end of the sleeve being formed to enclose the closed end of said tube, an outer window formed in the side wall of said sleeve in alignment with the first window, a horizontal carrier tube secured in the opening in the wall of said chamber, said carrier tube being slidably fitted to receive said sleeve, means for securing said instrument tube in said sleeve, and means for demountably securing said sleeve in said carrier tube whereby said instrument tube and its optical system contained therein together with said sleeve may be mounted and demounted as a completely operative assembly.

References Cited by the Examiner

UNITED STATES PATENTS

| | | | |
|---|---|---|---|
| 1,445,284 | 2/23 | Bell et al. | 88—72 |
| 2,594,970 | 4/52 | Monk. | |
| 3,018,375 | 1/62 | Graves et al. | |
| 3,038,374 | 6/62 | Humel | 88—39 |
| 3,041,916 | 7/62 | Clave et al. | 88—1 |
| 3,052,151 | 9/62 | Clave | 88—1 |

FOREIGN PATENTS

| | | |
|---|---|---|
| 229,329 | 5/59 | Australia. |
| 61,856 | 10/13 | Austria. |
| 1,197,111 | 6/59 | France. |

DAVID H. RUBIN, *Primary Examiner.*